May 5, 1964  P. F. DONLEY  3,131,941
SEALING UNIT
Filed Nov. 21, 1960  2 Sheets-Sheet 1
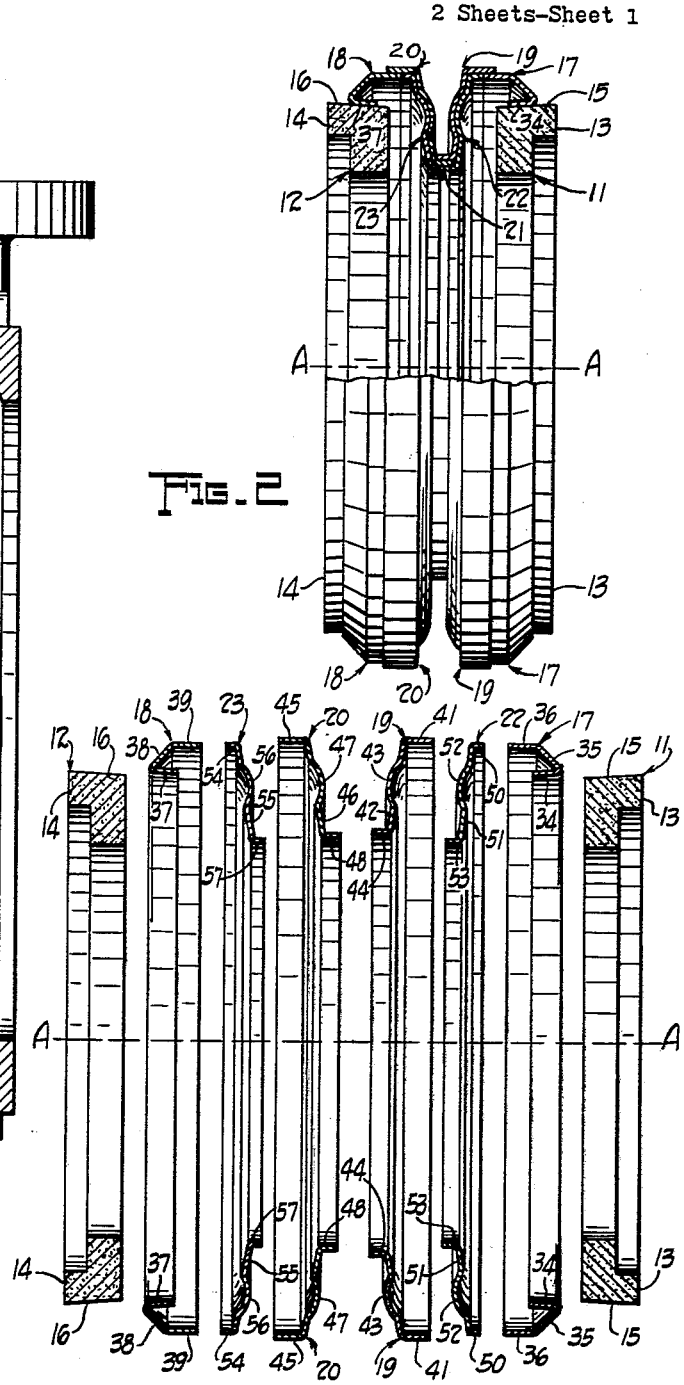
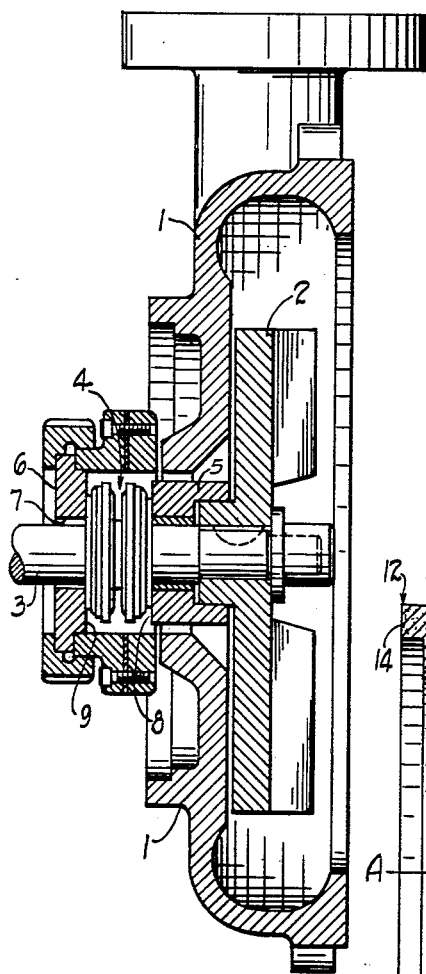
INVENTOR.
PHILIP F. DONLEY
BY Bosworth, Sessions,
Herrstrom & Knowles
ATTORNEYS.

May 5, 1964   P. F. DONLEY   3,131,941
SEALING UNIT
Filed Nov. 21, 1960   2 Sheets-Sheet 2
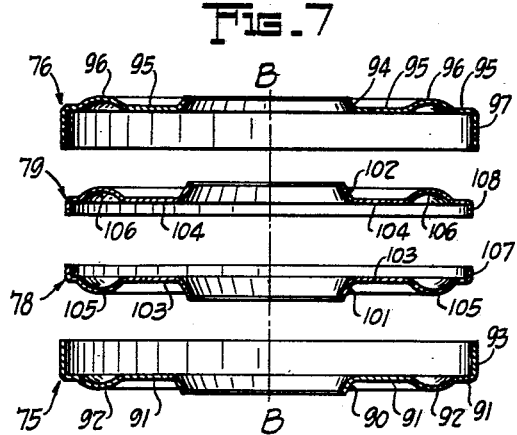
Fig. 7
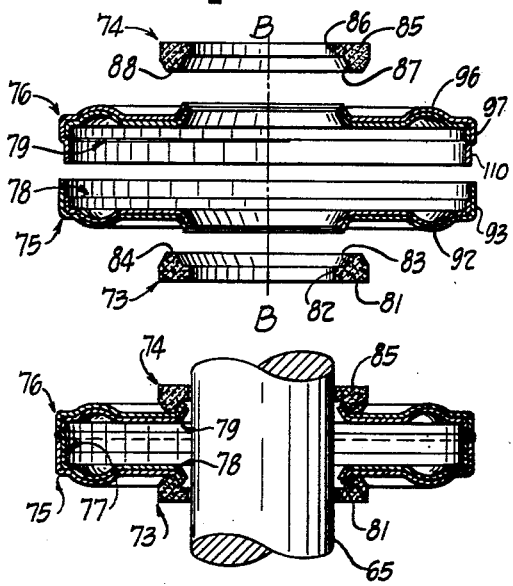
Fig. 6
Fig. 5
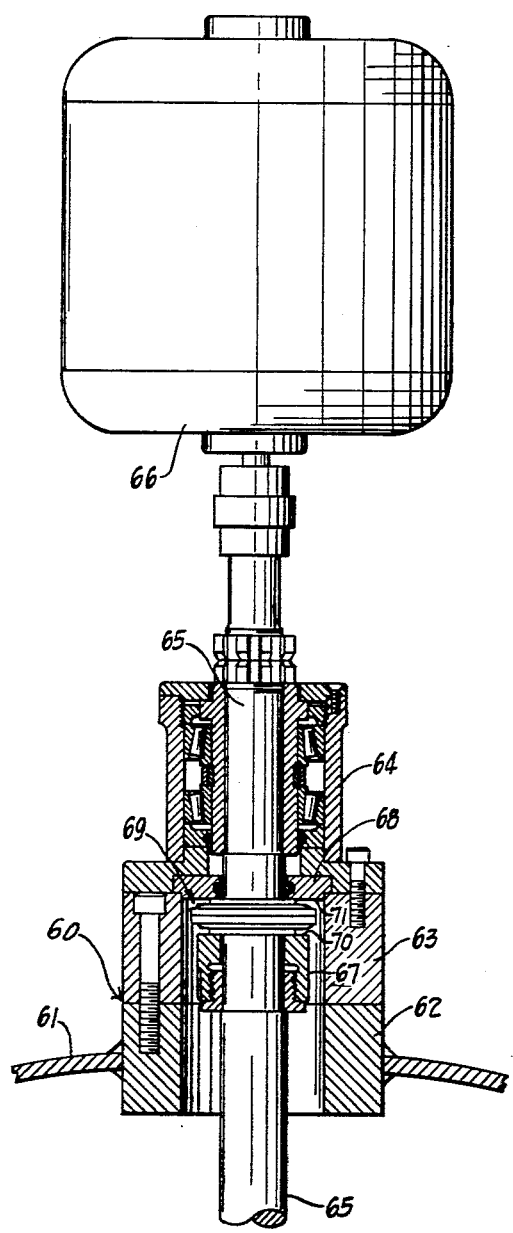
Fig. 4
INVENTOR.
PHILIP F. DONLEY
BY Bosworth, Sessions,
Herrstrom & Knowles
ATTORNEYS.

United States Patent Office 3,131,941
Patented May 5, 1964

3,131,941
SEALING UNIT
Philip F. Donley, Shaker Heights, Ohio, assignor to Donley Products, Inc., Cleveland, Ohio, a corporation of Ohio
Filed Nov. 21, 1960, Ser. No. 70,707
12 Claims. (Cl. 277—42)

The invention, which relates to sealing units for shafts, bearings and the like, has to do mainly with sealing units of the types described in United States Patents 2,776,851 and 2,941,825 to August H. Heinrich.

In industry, sealing units of conventional types, not including those of the above-mentioned patents, long have been among the most vulnerable components of the machines in which they are used; e.g., motors, generators, turbines, mixers, pumps and a wide variety of machines of other types. Even where there is no particular temperature or pressure differential as between conditions obtaining on opposite sides of the sealing unit, inside and outside, sealing units of conventional kinds often have short life expectancies. This is usually due to the fact that certain of the materials of which such sealing units are made, wholly or in part, stand up poorly, as evidenced by the recurring necessity for replacing sealing rings, diaphragms, gaskets, washers, springs and like elements.

The organic materials often used in certain of these elements are sometimes deleteriously affected by lubricating oil, which is often present in machines of kinds in which sealing units are employed. Frequently, these and kindred materials age poorly, especially under conditions in which they are subjected to superatmospheric temperatures or to wide variations in temperature. Others, including some metals, become eroded or abraded when they come into contact with solid particles, whether present from the outset, introduced in the form of contaminants in oils, greases and the like, or formed under the conditions under which the machine as a whole is operated. Still others become fatigued with use. Under conditions characteristic of many industrial installations, therefore, the life of a sealing unit of the conventional type tends to be short.

If the machine of which the sealing unit forms part is used for moving a fluid at a temperature well above atmospheric temperatures, as in handling steam piped from one place to another for use in prime movers, for heating or for processing, conditions unfavorable to the operation of conventional sealing units are likely to be present. In the handling of distillates in the vapor phase, as in an oil refinery, the problem is accentuated. Elsewhere in the process industries, as where acids, alkalies, detergents, slurries, etc. must be conducted to or from a given piece of equipment, conditions are even worse, this for the reason that substances of these types tend to attack many and perhaps most of the materials used in conventional sealing units. Thus the need for improved sealing units, particularly corrosion-resistant sealing units, is very great.

This invention has as one of its principal objects, over and above those achieved by the inventions of the above-mentioned Heinrich patents, to provide a sealing unit capable of trouble-free operation over comparatively long periods of time notwithstanding its use under the unfavorable conditions obtaining in typical process industries. Where, as in many such situations, the sealing unit must be capable of yielding in response to endwise movement of a shaft, the construction of the sealing unit must be such as to permit it to stand up under repeated flexing without cracking, softening or becoming more vulnerable to chemical attack. The provision of a sealing unit characterized by an unusually long life under difficult conditions, environmental and otherwise, is one of the major objects of the invention.

The invention further has for one of its objects to provide a sealing unit made of chemically resistant material that will not deteriorate or, if it does tend to deteriorate, that will not deteriorate rapidly, particularly at superatmospheric temperatures. In the accomplishment of this object, the invention contemplates the use of corrosion-resistant metal in most or all of the exposed portions of the sealing unit. Where expedient, it also contemplates the use therewith of internal supporting means, usually but not necessarily of other metallurgical or chemical composition, that tend to reinforce, enhance or otherwise improve the physical properties of such corrosion-resistant metal as, for example, by forestalling or delaying the onset of fatigue, softening and other kinds of deterioration.

As a specific object, the invention further contemplates enhancement of the action of the annular spring or springs characterizing a typical sealing unit of the sort disclosed in the above-mentioned Heinrich patents. Sealing units of this kind lend themselves to good advantage to the accomplishment of the aims of the invention, especially with respect to the features above brought out. It is probable, however, that in generally similar sealing units of different design the same or similar features may be used to advantage.

Other objects, advantages and features of the invention will be apparent from the description which follows and from the accompanying drawings, in which:

FIGURE 1 is a central vertical section through a pump provided with a sealing unit within the purview of the invention, the pump being shown on a reduced scale.

FIGURE 2 is a combined elevation and section on a larger scale through the sealing unit appearing in FIGURE 1.

FIGURE 3 is an exploded view showing in section the parts that go to make up the sealing unit of FIGURE 2.

FIGURE 4 is a central vertical section through the top portion of a mixer the shaft of which is provided with a sealing unit within the purview of the invention, the mixer being shown on a reduced scale.

FIGURE 5 is a section on a larger scale through the sealing unit appearing in FIGURE 4.

FIGURES 6 and 7 are exploded views showing in section the parts that go to make up the sealing unit in FIGURE 5.

The centrifugal pump illustrated in FIGURE 1 has a housing 1 of conventional shape surrounding an impeller 2 mounted in the usual way on the outboard end of pump shaft 3. Inwardly thereof; i.e., to the left as seen in FIGURE 1, pump shaft 3 supports a sealing unit that rides and tends to float on the surface of the shaft. The sealing unit is disposed between and to some extent compressed by bushing 5 and a removable end plate 6 provided with a central opening 7 accommodating the motor-coupled end of the pump shaft. Inner face 8 of bushing 5 and inner face 9 of end plate 6 are finished with a high degree of accuracy, as are the portions of the sealing unit that confront them. Respectively, faces 8 and 9 bear against the sealing faces of sealing rings 11 and 12 of sealing unit 4.

As indicated at the top of FIGURE 2, sealing rings 11 and 12 are provided respectively with sealing surfaces 13 and 14 for engagement with faces 8 and 9. Peripheral surfaces 15 and 16 of sealing rings 11 and 12 accommodate and hold in place the contiguous metal portions of the sealing unit; accordingly, they may, if desired, be referred to as "holding faces." Designated 15 in FIGURE 2, the holding face on sealing ring 11 is tapered at an angle of 5° to the longitudinal axis A—A of the sealing unit, less in any event than about 7½°; similarly, holding face 16 of sealing ring 12 is tapered at an angle of 5° in the opposite direction. In the preferred forms of the invention, sealing rings 11 and 12 are of compressed comminuted carbon.

Mounted on holding faces 16 and 17, respectively, are two annular metal supporting elements 17 and 18 of generally channel-shaped construction. Preferably these are formed as shown, described and claimed in Heinrich application Serial No. 844,959, filed October 7, 1959 (now Patent 3,028,163). Resistance-welded in fluid-tight fashion to annular supporting elements 17 and 18, respectively, are two annular metal leaf springs 19 and 20. The latter overlap each other as shown in FIGURE 2. Where they overlap, they are welded together by resistance welding to form a fluid-tight joint 21. Springs 19 and 20 appear to best advantage in FIGURE 3, wherein they occur near the median plane of the figure.

Referring to the showing toward the right in the same figure of annular supporting element 17, it will be noted that inner side wall 34 defines an acute angle and that outer side wall 36 defines an obtuse angle with channel base 35. The latter slants sharply with respect to the two side walls. It should further be noted that inner side wall 34 does not parallel axis A—A, as does outer side wall 36, but instead departs from parallelism with axis A—A by an angle corresponding to the angle of taper of holding face 15 of sealing ring 11. Annular supporting element 18, shown toward the left in FIGURE 3, is similarly formed with a slightly inclined inner side wall 37, a slanted base 38, and an outer side wall 39 that parallels the central axis A—A of the sealing unit.

Returning now to spring 19, it will be observed that this spring, like certain of those disclosed in Heinrich Patent 2,941,825, is characterized by a lip-like flange 41 on its outer periphery, by an intermediate annular portion 42 provided with a bowed portion 43 of short radius of curvature, and by a mounting flange 44 on its inner periphery, the latter extending toward the median plane of the sealing unit. Spring 20 is similarly constructed with a lip-like flange 45 on its outer periphery, an intermediate annular portion 46 provided with a bowed area of short radius of curvature, and a mounting flange 48 on its inner periphery, which, like mounting flange 44 on spring 41, extends toward the central portion of the sealing unit. Mounting flange 48 on spring 20 is, however, of somewhat smaller diameter than mounting flange 44 on spring 19, thus permitting the two to telescope together to form joint 21.

Reference to FIGURE 2 will show that a reinforcing member 22 of the nature of a follower is disposed after the fashion of a lining on the inside face of spring 19 and that a similar reinforcing member 23 is similarly disposed on the inside face of spring 20. As appears from FIGURE 3, the former is characterized, among other things, by an outwardly directed lip-like flange 50, an annular portion 51 including a bowed portion 52, and an inwardly directed lip-like flange 53; the latter, by an outwardly directed lip-like flange 54, an annular portion 55 including a bowed portion 56, and an inwardly directed lip-like flange 57. When supporting element 17 is welded to spring 19, lip-like flange 50 of reinforcing member 22 is clamped in position between them, after which it is permanently blocked against disengagement and held in touching contact with the inside face of spring 19. Lip-like flange 54 is similarly locked in place within spring 20.

Reinforcing members 22 and 23, although introduced as inserts, are preferably of spring metal and may be described as secondary springs to distinguish them from primary springs 19 and 20. They effectively back up primary springs 19 and 20, as a result whereof the overall spring action is much enhanced. They permit of the use of higher pressures without damage to the sealing unit, as by buckling. Their use in the form shown makes it unnecessary to attempt to weld them to the primary springs or to the supporting elements. By using them, the life of the sealing unit is greatly extended, especially at elevated temperatures. This is particularly true where the primary springs and other metal components of the sealing unit are of stainless steel, nickel-chromium alloys ("Inconel") or other corrosion-resistant metals, many of which tend to soften when used for prolonged periods at superatmospheric temperatures.

Because Inconel and similar alloys are at best relatively soft, it is advantageous to be able to reinforce the primary springs, if of such an alloy, with secondary springs of a somewhat harder spring metal such as half-hard or three-quarters-hard stainless steel. If desired, however, primary springs 19 and 20 may be fabricated instead from a commercial alloy of tantalum, titanium or zirconium and similarly reinforced by stainless steel secondary springs. Inasmuch as the secondary springs are on the inside of the sealing unit; i.e., away from the product being pumped, the material of which the secondary springs are formed does not come into contact with troublesome chemicals such as acids, alkalies, detergents, etc. On the other hand, those parts that are exposed to the action of the chemicals being pumped, being highly resistant to corrosion, are capable of standing up well even in the presence of a hot aqueous solution of caustic soda. Thus the life of the sealing unit as a whole is greatly extended.

Further by way of example of how metals of specifically different metallurgical compositions may be combined to extend the life of the sealing unit, mention may be made of the conjoint use of fully annealed ("dead soft") or quarter-hard stainless steel in the primary springs and supporting elements and of half-hard or three-quarters-hard stainless steel in the secondary springs. Fully annealed and quarter-hard stainless steels resist many chemicals without a great deal of difficulty but are subject to the criticism that their softness detracts from the spring action. In such circumstances, if primary springs of fully annealed or quarter-hard stainless steel are reinforced by secondary springs of a harder grade of stainless steel, such as half-hard or three-quarters hard, the spring action of the sealing unit as a whole will be considerably enhanced. It will be found to be adequate for many purposes, notwithstanding the fact that use is made of relatively inexpensive alloys.

The use of a fully annealed or quarter-hard stainless steel in the primary springs and supporting elements affords a further advantage because of the relative ease with which such steels can be fabricated. This is particularly true as regards sealing units of small diameter. In such sealing units, manufacturing difficulties are presented by nickel-chromium alloys and alloys of tantalum, titanium, zirconium and the like. Thus the use of reinforcing members to line the interior surfaces of the primary springs is of considerable advantage even in sealing units in which all parts other than the sealing rings themselves are of stainless steel.

FIGURE 4 is a section through the upper portion of a mixer provided with a shaft and blades for stirring. In the form shown, mixer 60 is provided with a top wall 61 surmounted by a circular mounting flange 62 to which is attached a separable collar 63. Bolted to the upper end of collar 63 is an anti-friction bearing assembly 64 of the tapered roller type. Bearing assembly 64 surrounds a vertical shaft 65 carrying the mixing blades (not shown) at its lower end and at its upper end an electric motor 66.

Elsewhere on shaft 65, ordinarily at about the level of mounting flange 62, is an adjustable abutment 67. Between abutment 67 and annular plate 68, which is clamped in place between collar 63 and bearing assembly 64, is a sealing unit 69 of the type shown in detail in FIGURE 5. Faces 70 and 71 of abutment 67 and annular plate 68, respectively, are finished with a high degree of accuracy so that they may cooperate with those portions of sealing unit 69 that bear against them, which likewise are highly finished. Like sealing unit 4 in the centrifugal pump of FIGURE 1, sealing unit 69 rides on the surface of the shaft, being compressed somewhat between abutment 67 and annular plate 68.

Respectively, FIGURES 5 and 6 show the assembled sealing unit in relation to shaft 65 and the incompletely assembled sealing unit as it would appear in exploded form. It will be noted that there are two sealing rings 73 and 74, one on each side of the two opposite sides of the sealing unit; two primary springs 75 and 76, which, when welded together, form a fluid-tight joint 77 (FIGURE 5); and two secondary springs 78 and 79. Sealing ring 73 is characterized by a sealing face 81, a cylindrical face 82, a holding face 83, and a flat face 84 that adjoins primary spring 75. Similarly, sealing ring 74 is characterized by a sealing face 85, a cylindrical face 86, a holding face 87, and a flat face 88 that adjoins primary spring 76. Although not so represented in FIGURES 5 and 6, holding faces 83 and 87 on sealing rings 73 and 74, respectively, make an angle of about 5°, less in any event than about 7½°, with the central axis B—B of the sealing unit.

Referring now to FIGURE 7, which shows the primary and secondary springs as they appear when first fabricated, it will be noted that primary spring 75 has a tapered lip-like supporting flange 90 on the inner periphery of an annular portion at 91 incorporating a bowed portion 92 of short radius of curvature. On its outer periphery, primary spring 75 has a mounting flange 93 that parallels the central axis B—B of the sealing unit. In like fashion, primary spring 76 is provided with a tapered lip-like supporting flange 94 on the inner periphery of an annular portion 95 incorporating a bowed portion 96 of short radius of curvature. On its outside periphery, primary spring 76 has a mounting flange 97 which is of the same diameter as and resembles mounting flange 93 on primary spring 75 in the sense that it is adapted to receive the secondary spring to be inserted within it. Lip-like supporting flanges 90 and 94 are tapered at an angle of the same order of magnitude as that characterizing holding faces 83 and 87 on sealing rings 73 and 74, respectively.

Secondary springs 78 and 79 resemble secondary springs of the previously-described embodiment of the invention in that they are characterized by tapered inner flanges 101 and 102, intermediate portions 103 and 104 with bowed portions 105 and 106, and outer flanges 107 and 108 that parallel axis B—B.

In the assembly of the sealing unit, secondary spring 78 is inserted inside primary spring 75. In like manner, secondary spring 79 is inserted inside primary spring 76. With secondary spring 79 held firmly in place, primary spring 76 is then subjected to a pressing operation providing in mounting flange 97 the shallow offset 110 appearing in FIGURE 6. In this way, secondary spring 79 is locked in place in primary spring 76. Offset portion 110 is preferably of a diameter such as to permit it to be received snugly within mounting flange 93 on primary spring 75. The fluid-tight joint 77 seen in FIGURE 5 is produced by welding or otherwise bonding the two primary springs together, as by a metallic bond. Sealing rings 73 and 74 are then urged into place on lip-like supporting flanges 90 and 94, respectively.

As in the case of the previously described embodiment of the invention, primary springs 75 and 76 may be of metal of a given metallurgical composition and secondary springs 78 and 79 of metal of a different metallurgical composition. Thus, primary springs 75 and 76 may, if desired, be of Inconel, tantalum, titanium, zirconium or some similar corrosion-resistant alloy and secondary springs 78 and 79 may be of stainless steel. If desired, primary springs 75 and 76 may be of relatively soft stainless steel in order to take advantage of the fact that it may be worked without undue difficulty while secondary springs 78 and 79, which require less drastic working, may be of a harder grade of stainless steel. In any event, the additional spring action provided by the secondary springs amplifies the spring action inherent in the primary springs and, where the latter spring action is not in and of itself as great as may be desired, can complement it to a degree sufficient to make the sealing unit as a whole highly useful in an environment in which it is subjected to the action of corrosive agents such as acids, alkalies, detergents and the like.

It is evident that in heavy-duty sealing units of the types shown and described important advantages are made possible by this combination of a corrosion-resistant primary spring that is relatively easily fabricated with a secondary spring that is firm enough to give the desired over-all spring action, even though the metallurgical composition of the secondary spring may not be such as to permit it, in and of itself, to stand up for long periods of time in the presence of acids, alkalies or other chemicals. The fact that the secondary springs are on the inside surfaces of the sealing unit; i.e., out of contact with the material being handled, makes it unnecessary that the material of the secondary spring be highly resistant to corrosion so long as the material of the primary spring is itself suitably resistant to chemical attack, erosion, fatigue, etc. Sealing units tested under heavy-duty conditions over long periods of time have given surprisingly good results from the standpoint of resistance to degeneration of these and other kinds to which such a sealing unit is normally regarded as susceptible.

It is intended that the patent shall cover, by summarization in appended claims, all features of patentable novelty residing in the invention.

What is claimed is:

1. A sealing unit for use with shafts, shaft-mounted bearing races and the like comprising two primary leaf springs in proximate relation to each other each of which is of annular shape, characterized by inside and outside faces, and provided with a bowed portion between its inner and outer peripheries; two secondary leaf springs of the nature of spring followers, one for each of said primary springs, each of which is of annular shape and each of which has a bowed portion between its inner and outer peripheries, said secondary springs lining the inside faces of said primary springs, a mounting flange on each of said primary springs along one of its peripheries, said mounting flanges engaging each other; and, supported from said primary springs, two oppositely directed sealing rings adapted to contact with surfaces to be sealed.

2. A sealing unit according to claim 1 in which the secondary springs line the proximate faces of the primary springs.

3. A sealing unit according to claim 1 in which the secondary springs line the non-proximate faces of the primary springs.

4. A sealing unit for use with shafts, shaft-mounted bearing races and the like comprising two primary leaf springs in proximate relation to each other each of which is of annular shape, characterized by inside and outside faces, and provided with a bowed portion between its inner and outer peripheries; two secondary leaf springs of the nature of spring followers, one for each of said primary springs, each of which is of annular shape and each of which has a bowed portion between its inner and outer peripheries, said secondary springs lining the inside faces of said primary springs; a mounting flange on each of said springs along one of its peripheries, said mounting flanges engaging each other; supporting means on each of said springs along the other of its two peripheries; and, supported therefrom, sealing rings provided with oppositely directed surfaces adapted to contact the surfaces to be sealed.

5. A sealing unit according to claim 4 in which the secondary springs are held in place by the primary springs.

6. A sealing unit for use with shafts, shaft-mounted bearing races and the like comprising two oppositely directed sealing rings each of which has a flat sealing surface; corrosion-resistant metal means supporting the sealing rings in spaced relation to each other with their sealing surfaces in contact with the surfaces to be sealed; two juxtaposed primary leaf springs of annular shape carrying the supporting means, said primary springs being of corrosion-resistant metal; two secondary leaf springs of the nature of inserts lining the inside faces of the primary springs, said secondary springs being of annular shape, and corrosion-resistant metal means connecting the primary springs.

7. A sealing unit according to claim 6 in which the corrosion-resistant metal is a tantalum alloy.

8. A sealing unit according to claim 6 in which the corrosion-resistant metal is titanium alloy.

9. A sealing unit according to claim 6 in which the corrosion-resistant metal is a zirconium alloy.

10. A sealing unit for use with shafts, shaft-mounted bearing races and the like comprising two oppositely directed sealing rings; two channel-shaped annuli of corrosion-resistant metal supporting the sealing rings with their sealing surfaces in contact with the surfaces to be sealed; two spaced but interconnected primary leaf springs of annular shape each of which supports one of the two channel-shaped annuli, said primary springs being of corrosion-resistant metal; two secondary leaf springs of annular shape each of which lines the inside face of one of the two primary springs; and means retaining the secondary springs in engagement with the primary springs.

11. A sealing unit according to claim 10 in which the secondary springs and the channel-shaped elements abut each other at their edges.

12. A sealing unit according to claim 11 in which the secondary springs are clamped in place between the primary springs and the channel-shaped elements.

References Cited in the file of this patent

UNITED STATES PATENTS

| | | |
|---|---|---|
| 2,202,908 | Hubbard | June 4, 1940 |
| 2,216,107 | Betzold | Oct. 1, 1940 |
| 2,251,020 | Murphy | July 29, 1941 |
| 2,941,825 | Heinrich | June 21, 1960 |